United States Patent

Gilbert et al.

[11] Patent Number: 5,987,138
[45] Date of Patent: Nov. 16, 1999

[54] IDENTIFICATION AND/OR SIGNATURE PROCESS

[75] Inventors: Henri Gilbert, Bures sur Yvette; Frédéric Cherbonnier, Paris, both of France

[73] Assignee: France Telecom, Paris, France

[21] Appl. No.: 08/834,923

[22] Filed: Apr. 7, 1997

[30] Foreign Application Priority Data

Apr. 9, 1996 [FR] France ................... 96 04406

[51] Int. Cl.⁶ .................. H04K 1/00; H04L 9/30
[52] U.S. Cl. .................................. 380/30; 380/23
[58] Field of Search ........................ 380/23, 30

[56] References Cited

U.S. PATENT DOCUMENTS

| | | | | |
|---|---|---|---|---|
| 5,140,634 | 8/1992 | Guillou | .................. | 380/23 |
| 5,218,637 | 6/1993 | Angebaud | .................. | 380/23 |
| 5,600,725 | 2/1997 | Rueppel | .................. | 380/30 |

FOREIGN PATENT DOCUMENTS

| | | | |
|---|---|---|---|
| 0325238 | 1/1989 | European Pat. Off. | .......... G07F 7/10 |
| 0 311 470 | 4/1989 | European Pat. Off. | . |
| 0 325 238 | 7/1989 | European Pat. Off. | . |

*Primary Examiner*—Tod R. Swann
*Assistant Examiner*—Todd Jack
*Attorney, Agent, or Firm*—Oblon, Spivak, McClelland, Maier & Neustadt, P.C.

[57] ABSTRACT

According to the invention, the secret key of the claimant is constituted by k numbers $s_1, s_2, \ldots, s_k$ with a low public exponent. The verifier draws k numbers $a_1, a_2, \ldots, a_k$ in which the number of non-zero $a_i$ is below a given number p. The claimant or signatory calculates an answer involving an exponential product of form $s_i{}^a{}_1$ with i between 1 and k. The verifier calculates another exponential product of form $v_i{}^a{}_1$, where the $v_i$ are numbers corresponding to the public key of the claimant or signatory. The verifier then verifies that the result obtained is correct. The choice of the public exponent and the limitation on p make it possible to reduce the number of secrets for equal security and an approximately equal number of multiplications.

15 Claims, 1 Drawing Sheet

IDENTIFICATION AND/OR SIGNATURE PROCESS

CROSS-REFERENCE TO RELATED APPLICATIONS

This application claims priority from French Application No. 9604406 filed Apr. 9, 1996.

BACKGROUND OF THE INVENTION

Field of the Invention

The present invention relates to an identification and/or signature process.

The invention concerns public key cryptography. In this field, identification is a procedure enabling a receiving entity to obtain assurance of the authenticity of the identity of a transmitting entity. Signature is a procedure ensuring the authenticity of a message sent by a transmitting entity to a receiving entity.

The invention has numerous applications in health, transportation, telecommunications and banking. In general terms, the invention uses signature and identification schemes based on the difficulty of factorizing a large number, said schemes requiring the performance of operations essentially amounting to modular multiplications of large numbers.

For a given scheme, the number of modular multiplications to be performed by the person having to sign the message and prove his identity is a crucial parameter, particularly in the case where the security module in which are performed the cryptographic calculations is a smart card. For most known schemes, the number of multiplications necessary leads, in the case of placing on a smart card using a standard microprocessor, a relatively unrealistic calculation time with respect to the signature and penalizing for the identification. It is possible to obtain much more acceptable signature and identification times by giving the card a crypto-graphic coprocessor, but this choice doubles the price of the card.

One of the aims of the present invention is to adequately reduce the number of modular multiplications necessary for an identification and/or a signature, in order to arrive at schemes which can be used in a smart card not having an arithmetic coprocessor.

The present invention relates to an identification and/or signature process, which can be likened both to the identification and signature scheme of FIAT and SHAMIR and to the identification and signature scheme of GUILLOU and QUISQUATER. The process of the invention is directed at an interesting compromise between the number of multiplications to be performed by the party wishing to prove his identity and the party checking it and the number of secrets which the former must hold.

DESCRIPTION OF THE RELATED ART

In order to simplify terminology, the entity whose authenticity has been verified is called the "claimant" and the entity verifying said authenticity the "verifier".

Several identification and signature schemes are known and are placed in three families:
A. Schemes Based on the Difficulty of Factorizing a Large Number The schemes of this family can be used both for identification and signature. Thus, the so-called RSA ("RIVEST-SHAMIR-ADLEMAN") public key encryption algorithm described in U.S. Pat. No. 4,405,829, which is at present the most widely used public key algorithm, supplies signature schemes (such as e.g. the signature method described in ISO standard 9796) also usable for identification purposes.

Other schemes have appeared such as the FIAT and SHAMIR identification scheme described in U.S. Pat. No. 4,748,668 and the GUILLOU and QUISQUATER identification scheme described in FR-A-2 620 248 (or the corresponding EP-A-311 470 or corresponding U.S. Pat. No. 5,218,637).

They also appear among the most widely used solutions, because they offer numerous advantages:

They provide a realistic signature scheme.

They require less calculations for the claimant than the RSA scheme.

They use a so-called zero knowledge proof procedure, i.e. the claimant does not reveal his secret and consequently said secret is not weakened by the use of the secret of the claimant in identification exchanges.

The control of the public keys can, as an option, be based on identity, i.e. it is possible to take for the identification or signature public key of a user parameters which enable anyone to deduce the identity of said user. This method simplifies the control of the public keys. It obviates the need for the claimant to give his public key and the signature by an authority of the correspondence between said public key and his identity (X509 certification method, based on the name of the UIT recommendation describing it).

B. Schemes Based on the Difficulty of the Problem of the Discrete Logarithm in a Large Finite Group Among the schemes of this family usable both in identification and signature, reference can be made to the following:
- the scheme of T. EL GAMAL, described in the article "A public key cryptosystem and a signature scheme based on discrete logarithms", published in IEEE Transaction on Information Theory, vol. IT-31, pp 469–472, 1985,
- the scheme of SCHNORR, described in EP-A-384 475 and U.S. Pat. No. 4,995, 082, which is a zero knowledge proof scheme from which a realistic signature scheme can be drawn,
- the DSS (Digital Signature Standard) scheme based on the two aforementioned schemes and described in U.S. Pat. No. 5,231,668.

None of these schemes is suitable for a management or control of keys based on identity.
C. Schemes Based on the Difficulty of Problems not Resulting from the Algebraic Theory of Numbers (Purely Combinational Problems, etc.)

Zero knowledge proof identification schemes not based on factorization or discrete logarithm have been recently proposed. These in particular apply to the so-called PKP scheme of A. SHAMIR published in an article entitled "An efficient identification scheme based on permuted kernels", in reports of the CRYPTO '89 conference, LNCS 435, pp 235–251, Springer Verlag, 1989 and the so-called SD scheme of J. STERN described in the article entitled "A new identification scheme based on syndrome decoding", published in reports of CRYPTO '93, LNCS 773, pp 13-21, Springer Verlag, 1994.

However, none of the identification schemes of the said family proposed up to now supplies an effective signature method.

Returning to the schemes of FIAT and SHAMIR, as well as GUILLOU and QUISQUATER, in the basic versions these are identification schemes with three passes or phases between a claimant and a verifier, namely sending by the claimant of a number known as a control, sending by the verifier of a question and sending by the claimant of an answer. These two schemes at the same time supply a non-interactive signature scheme (i.e. in one pass) by a general process consisting of replacing the question by a function of the control and the message to be signed. This process will be described hereinafter.

In the signature schemes under consideration and optionally in the identification schemes, use is made of a single direction function H (which can in practice be calculated with the aid of a condensation function such as MD5) of fixed output size at least equal to 64 bits. The function H must be easy to calculate but, given an input x, it must be beyond the scope of a computer to find a second input x' separate from x such that H(x')=H(x).

For an identification scheme, the term "security level" is given to the maximum probability for a defrauder (not holding the secret of the claimant) to correctly reply to a random question of the verifier. For the schemes under consideration, it is possible under certain conditions on public exponents used, to show that the security level is equal to the inverse of the number of possible questions (assumed to be drawn according to the uniform law). This definition can easily be extended to the signature scheme associated with an identification scheme. It is generally accepted that a security level of approximately $2^{-20}$ is desirable for an identification scheme and that a security level below $2^{-64}$ is desirable for a signature scheme.

With more particular regard to the FIAT and SHAMIR scheme, it is pointed out that it is based on the difficulty of factorizing a number n, which is the product of two large prime numbers p and q. The secret key of a claimant P is constituted by k numbers $s_1, s_2, \ldots, s_k$ below n. The public key of the claimant is constituted by the number n and k numbers $v_1, v_2, \ldots, v_k$ obtained from $s_1, s_2, \ldots, s_k$ in the following way:

$$v_{1=s1}^{-2} \bmod n; \ldots; v_{k=sk}^{-2} \bmod n$$

The basic protocol in three passes and four operations, which enables a claimant P to be identified with respect to a verifier V is as follows:

(1) P draws a number r between 0 and n−1 and transmits to V the number $x=r^2 \bmod n$, or a single direction function of x, designated h=H(x), the number x (or h) being called the control.

(2) V draws k bits $a_1$ to $a_k$ and transmits to P the question formed by the set of said bits $(a_1, \ldots, a_k)$.

(3) P calculates the answer $$y = r \prod_{i=1\ldots k} s_i^{a_1} \bmod n$$

and transmits it to V.

(4) V verifies that $$y^2 \cdot \prod_{i=1\ldots k} v_i^{a_1}$$

is equal to the control x or that $$H\left(y^2 \cdot \prod_{i=1\ldots k} v_i^{a_1}\right)$$

is equal to the control h.

This protocol can be repeated a number t times either sequentially (3.t pass protocol) or in parallel (3 pass protocol): (1) sends t controls $x_1$ to $x_t$ (or $h_1$ to $h_t$), (2) sends t questions of k bits, (3) sends t answers $y_1$ to $_t$ and (4) verifies t corresponding equations.

This identification protocol can be transformed into a non-interactive signature scheme. Only the case of the basic protocol will be explained In order to sign a message m, the claimant P produces a control x corresponding to a random number r. By means of a single direction function and on the basis of the message m and the control x, it also calculates H(m,x). Then P calculates the answer y corresponding to the question $(a_1, \ldots, a_k)$=H(m,x). The signature of the message is constituted by the word $(a_1, \ldots, a_k)$ and the number y. The verification of the signature of the message consists, for the verifier, ensuring that:

$$H\left(m, y^2 \cdot \prod_{i=1\ldots k} v_i^{a_1}\right) = (a_1, \ldots, a_k)$$

This process of transforming a three pass identification scheme into a signature scheme is of an entirely general nature and is also applicable to the variant of the FIAT and SHAMIR scheme obtained by performing t times the basic protocol in parallel.

In the FIAT and SHAMIR scheme, the number of modular multiplications required for the claimant in the general three pass scheme of parameters k and t and for the associated signature scheme is on average t(1+k/2) (i.e. one multiplication for the calculation of each control and one multiplication for each bit $a_i$ equal to 1). The number of multiplications to be performed by the verifier is also on average t(1+k/2) for a security level of $2^{-kt}$.

The memory capacity required for the storage of the secret key is k words of the same size as n (at least 512 bits).

The interest of the general scheme (t differing from 1) is to permit, for a fixed security level, a decrease in the number k of secrets, but in counterpart the number of bits to be exchanged is multiplied by a factor t.

In the case where t=1, a complexity of 11 multiplications is obtained for a signature on 20 bit questions and 33 multiplications for an authentication on 64 bits.

However, the same security level ($2^{-k}$) as previously can be achieved with lower order questions. To do this, instead of using k secrets and taking for sets of questions the set E of words of k bits, use is made of a number of secrets k' exceeding k and for the set F of questions is taken words of k' bits with an order equal to (or lower or equal) to a chosen number p. The number of multiplications passes on average from k/2 to at the most p. The counterpart of this time gain is the increase in the number of secrets which must be stored by the claimant and which passes from k to k'.

On e.g. using the FIAT and SHAMIR basic scheme, one pass with k=64, the relation $$C_{16}^{128} > 2^{64}$$

shows that the set E of words of size k'=128 comprises a subset F formed by words of order p=16, whereof the cardinal number exceeds the cardinal number of the set E of words of order 64. If the verifier chooses his question in this subset, the security level will remain the same, whilst the time necessary for calculating the answer will pass from 32 to 16. Conversely, the claimant must store 128 secret keys instead of 64.

With regards to the GUILLOU and QUISQUATER scheme, it is recalled that it is based, like the previous scheme, on the difficulty of factorizing a number n, which is the product of two large prime numbers p and q. Instead of proving that he holds the modulo n square roots of public numbers, the claimant shows that he holds the eth modulo n root of his public key, in which e is a number whose size is typically 16 or 20 bits in the case of an identification scheme and at least 64 bits in the case of a signature scheme. The secret key s of the claimant is linked with the public key v by the relation:

$$v = s^{-e} \bmod n.$$

The identification protocol enabling a claimant P to identify himself with a verifier V is then as follows:

(1) P draws a number r between 0 and n−1 and transmits to V the number $x = r^e \bmod n$ or a function of x, designated $h = H(x)$, the number x (or h) being called the control.

(2) V draws a question a between 0 and e−1 of size k bits and transmits to P the question a.

(3) P calculates the product $y = r \cdot s^a$ and transmits it to V.

(4) V verifies that $y^e \cdot v^a$ is equal to the control or that $H(y^e \cdot v^a)$ is equal to h.

A signature scheme can be derived from such an identification scheme by a process similar to that described hereinbefore in connection with the FIAT and SHAMIR scheme. In order to sign a message m, P draws a number r, deduces therefrom the control x, calculates $H(m,x)$ and calculates the answer y corresponding to the question $a = H(m,x)$. The pair (a,y) constitutes the message signature.

The situation can e.g. be such that e is chosen to minimize the complexity of the calculations, bearing in mind the security parameters namely the size of n and length k of questions. The number e is assumed to be very close to $2^k$ and for certain values of k it is e.g. possible to take $e = 2^k + 1$. The number of modular multiplications required by the calculation of the control x by P is, for such a choice k+1. Moreover, the number of multiplications necessary for the calculation of the answer y is on average 3k/2. Thus, we obtain an average number of multiplications 1+5k/2 for P (instead of 1+k/2 with the FIAT and SHAMIR basic scheme), no matter whether it is an identification or a signature scheme. The average number of multiplications to be performed by the verifier is also 1+5k/2.

The secret key size is very short, a single word of the same size as the module n (to be compared with k secrets of the same size as n in the FIAT and SHAMIR scheme).

Thus, there is a complexity of 51 multiplications for a security level $2^{-20}$ identifications and 161 multiplications for a security level $2^{-64}$ signature.

The calculation of modular exponentials represents the preponderant part of the calculation time in the previously described schemes. Use is generally made of the BSM algorithm (binary square and multiply algorithm) or its m-adic version, which consists of initially calculating the powers $m^k$-th in order to multiply them together. When the exponent is a binary number of length k, the requisite calculation time is consequently 3 k/2.

BRICKELL, GORDON, McCURLEY and WILSON in an article entitled "Fast exponentiation with precomputation", published in Proceedings EUROCRYPT '92, pp 200–207, LNCS, vol. 658, Springer Verlag 1993, on the one hand and DE ROOIJ in an article entitled "Efficient exponentiation using precomputation and vector addition chains", published in Proceedings EUROCRYPT '94, pp 389–399, LNCS 950, Springer Verlag, 1994 on the other, proposed methods making it possible to speed up calculations in the case where it is wished to calculate, modulo one same number n, several exponentials of a same number g for varied exponents u. These methods are based on the calculation and store beforehand of well chosen powers of number g.

For the GUILLOU and QUISQUATER scheme, the methods of BRICKELL et al. on the one hand and DE ROOIJ on the other make it possible to reduce the multiplications necessary for calculating the answer $y = r \cdot s^a \bmod n$, provided that prior storage has taken place in the security module of the claimant of well chosen powers of his secret key s. However, the number of multiplications reduced by this method is limited because it only effectively applies to the calculation of the answer y and not to the prior calculation of the control x.

Although the characteristics of the FIAT and SHAMIR schemes on the one hand and GUILLOU and QUISQUATER schemes on the other mentioned hereinbefore (possibility of the control of public keys based on identity, complexity of calculations, necessary memory space for storing secrets and the performance of calculations, number of bits to be exchanged) place these two schemes in a very good position among known identification and signature methods, the complexity of the calculations remains very high for a smart card not having a cryptographic coprocessor.

For the GUILLOU and QUISQUATER scheme, the number of multiplications required on the part of the claimant for an identification (approximately 40 multiplications) exceeds that which can be carried out in an acceptable time by a general-purpose 8 bit micro-processor. In the case of the FIAT and SHAIIR scheme, it is possible to drop to an acceptable number of multiplications for such a processor (approximately 10), but at the cost of increasing the size of the secret key by a factor typically equal to 16 (or 8 in the case where it is possible to accept the fact that the number of exchanged bits is roughly doubled).

Finally, neither of these two schemes leads to a satisfactory solution for performing signature calculations on a general-purpose smart card. The number of multiplications required for the GUILLOU and QUISQUATER scheme exceeds 100, even if precalculation takes place of the powers of the secret key in the card and for a FIAT and SHAMIR type signature the number of secrets of length 512 bits or higher is at least 64 if it is wished to limit the number of bits to be exchanged between the verifier and the claimant.

SUMMARY OF THE INVENTION

The object of the invention is to obviate the disadvantages of the previously analyzed identification and signature processes.

To this end, the present invention proposes a mixed scheme, i.e. intermediate between the FIAT and SHAMIR schemes on the one hand and the GUILLOU and QUISQUATER schemes on the other. This scheme, like the previous schemes, is based on the difficulty of factorizing a large number, the product of two large prime numbers p and q.

Although the present invention shares some common features with the FIAT and SHAMIR schemes, significant differences exist. Specifically, the identification method of the present invention includes steps of choosing an integer p based on the desired security level, wherein 1<p<k, drawing p integers between 1 and k included, drawing p numbers $a_p$'s such that $1 \leq a_p \leq e-1$, and setting $a_i=0$ for $i \neq p$ and for $1 \leq i \leq k$. In a preferred embodiment, p is chosen to be about ½k. The question sent by the verifier to the claimant thus only includes p non-zero $a_k$'s.

DETAILED DESCRIPTION OF THE INVENTION

Figure 1:
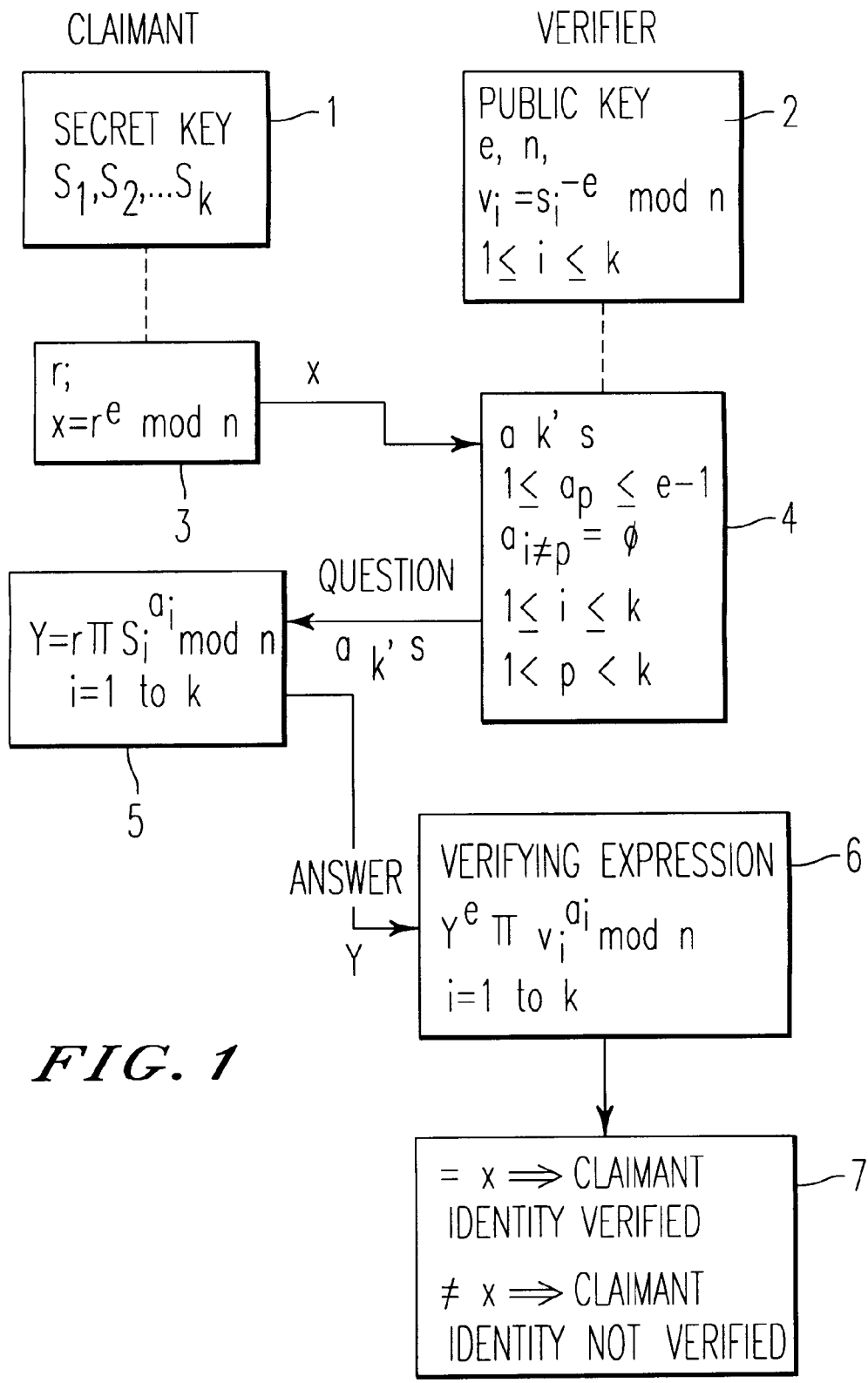
FIG. 1 shows a flow chart of the method for verification of the present invention.

According to the invention and as illustrated in FIG. 1:
- the claimant has a secret key 1 constituted by k numbers $s_1, s_2, \ldots, s_k$ lower than a number n, and a public key constituted by the number n, a number e called the public exponent and k numbers $v_1, v_2, \ldots, v_k$ defined by $v_i = s_i^{-e}$ mod n, the index i assuming all integral values of 1 inclusive to n inclusive, the public exponent e being a small integer equal to or greater than 3,
- the verifier knows the number n, the number e and the k numbers $v_1, v_2, \ldots, v_k$, constituting the public key 2 of the claimant.

In the case of an identification scheme, the process according to the invention is also characterized by the fact that it comprises the following successive operations:

a) the claimant P draws a number r between 0 and n−1, calculates the number $x=r^e$ mod n in box 3 and transmits to the verifier V the number x (or a function of x designated h=H(x), where H is a single direction function), the number x (or the number h) being called the control, b) in box 4 the verifier draws k numbers $(a_1, \ldots, a_i, \ldots, a_k)$, each number $a_i$ being between 1 and e−1, the number of non-zero $a_i$ being at the most equal to a chosen number p, and transmits to the claimant the set of numbers, said set being called the question, c) in box 5 the claimant calculates an answer y, on the basis of the drawn number r, numbers $s_i$ constituting the secret key and numbers $a_i$ forming the question, the answer y being defined by the product:

$$y = r \prod_{i=1 \text{ to } k} s_i^{a_i} \bmod n$$

and the claimant P transmits this answer y to the verifier V, d) on the basis of the answer y which he has received, the number e and the numbers $v_i$ known through the public key of the claimant, the verifier calculates in box 6 the quantity:

$$y_e \prod_{i=\text{e.g. 1 to } k} v_i^{a_i} \text{ or } H\left(y^e \cdot \prod_{i=\text{e.g. 1 to } k} v_i^{a_i}\right)$$

and verifies in box 7 that the result obtained does indeed give the control x (or h).

The process of the invention may appear similar to the generalization of ISO standard 9798-5, but the invention introduces original elements into the choice of the exponent e and the question of the verifier.

The security level of the process according to the invention (i.e. the success probability of a defrauder), determined by the question number of order p (respectively of order equal to or lower than p) is:

$$C_k^p \cdot (e-1)^p \left( resp \left( \sum_{i=0}^{p} C_k^i \right) (e-1)^p \right)$$

The number of terms of products $$\prod_{i=1 \text{ to } k} s_i^{a_i}$$

(calculations performed by the claimant and $$\prod_{i=\text{e.g. 1 to } k} v_i^{a_i}$$

(calculations performed by the verifier) which, if the byte $(a_1, \ldots, a_k)$ was drawn without any order condition would on average be k(1−1/e), is here equal at the most to p, which, for a constant security level, can lead to a significant time gain. However, the counterpart of this gain is the increase in the number k of secrets which the claimant must store.

This basic process can be repeated a number t times, either sequentially (3·t pass protocol) or in parallel (3 pass and four operation protocol): (1) sending t controls $x_1$ to $x_t$, (or $h_1$ to $h_t$), (2) sending t questions of k bits, (3) sending t answers $y_1$ to $y_t$, and (4) verifying t corresponding equations.

The choice of the public exponent e which, according to the invention is a small integer exceeding 3, offers advantages. It reduces the number of secrets (by a factor of approximately $\log_2 e$) or passes (parameter t) for an equal security level, compared with a FIAT and SHAMIR type scheme (where the exponent is equal to 2). However, as the exponent e remains low (compared with values such as $2^{16}+1$ proposed in the literature), the number of multiplications remains small and relatively close to that required by the value 2. The term small integer is here understood to mean an integer approximately below 100. It is e.g. possible to take e=5 or e=17.

In other words, the combination of the order k byte selection method and the use of low values for the public exponent, for an equal security level and an approximately equal number of multiplications, it is possible to reduce the number k of secrets and therefore memory space or the number t of passes and therefore length of exchanged messages compared with a FIAT and SHAMIR type scheme. The parameters k and t have a decisive importance for smart card applications.

The invention also relates to a message signature process corresponding to the identification process defined hereinbefore. The claimant then becomes the signatory S, characterized by the fact that it comprises the following successive operations:

a) the signatory S draws a number r between 0 and n−1 and calculates the number $x=r^e$ mod n, the number x being called the control, b) the signatory S calculates, from the message m, the control x and a single direction function H, a question $(a_1, \ldots, a_i, \ldots, a_k)=H(m,x)$, where the $a_i$ are between 1 and e−1, the number of non-zero $a_i$ being at the most equal to a chosen number p, c) the signatory S calculates the answer y by the product $$y = r \prod_{i=e.g.\ 1\ to\ k} s_i^{a_i} \bmod n$$

the pair (a,y) constituting the signature of the message m, d) the verifier calculates $$H\left(m, y^e\right) \prod_{i=e.g.\ 1\ to\ k} v_i^{a_i}$$

and verifies that the result obtained is equal to $(a_1, a_2, \ldots, a_k)$.

These processes require both on the part of the claimant or signatory and the verifier the calculation of exponential products of form:

$$P = \prod_{i=0}^{m-1} v_i^{a_i} \bmod n$$

where the $v_i$ are in practice modulo n integers and the terms $a_i$ of the integers are between 0 and e−1. In order to speed up such calculations, the invention also proposes a process for the calculation of such products, which is applicable both in the case of the processes according to the invention and in the case of message identification and/or signature processes using such products. This process is as follows:

1. initially S=P=1 and d=b−1 is set,
2. this is followed by a calculation $$S = S^* \prod_{\substack{0 \leq i < m \\ a_i = d}} v_i$$

3. the product S*P is taken for the new value of P,
4. d=d−1 is set and phases 2 and 3 are repeated with d positive.

The final value of P is the sought product. Therefore the necessary calculation time is increased by m'+b−3, in which m' is the number of non-zero terms $a_i$.

This calculation process is appropriate for the calculations performed in the identification and/or signature process of the invention. Thus, in the expressions of exponential products occurring in the process, the number m' of terms is limited, particularly in the case where use is made of the process for modifying the set of questions described hereinbefore and the exponents are increased by e−1, which is a small number.

For explanation purposes, three examples of the process according to the invention can be given in the case of a signature on 64 bits.

EXAMPLE 1

In the first example, the three pass scheme described hereinbefore is used with k=35 and e=5. The exponential product calculation algorithm described hereinbefore is used during the calculation of the answer. Thus, the complexity in terms of modular multiplications is:

- for pass 1 (control calculation): 3 multiplications,
- for pass 3 (answer calculation): p+e−2 multiplications, where p is the number of non-zero $a_i$.

The verifier applies the aforementioned process in order to present to the claimant a question only having a few non-zero $a_i$. He chooses for this a subset S of [1, ..., 35] formed by 16 terms, i.e.

$$C_{35}^{16} \cong 2^{32}$$

possibilities. For any i not belonging to the sub-set S, he the sets $a_i=0$ and, for any i belonging to S, he takes for $a_i$ a random value between 1 and 4, which corresponds to a 2 bit word. Thus, the security level is $2^{-64}$. Thus, the verifier will submit to the claimant a question with p=16 and the total calculation time will consequently be 3+16+5−2=22 multiplications.

EXAMPLE 2 e=5 and k=10 are taken giving a calculation time of 3+5+5−2=11 multiplications for a security level given by the number of questions:

$$2^{18} \cong 2^{2*5} * C_{10}^5$$

EXAMPLE 3 e=17 and k=22 are taken and there is a calculation time of 5+11+17−2=31 multiplications for a security level given by the number of questions:

$$2^{64} \cong 2^{4*11} * C_{22}^{11}$$

In the following table, it is possible to compare the processes both for identification and signature. In the table, FS represents the FIAT and SHAMIR algorithm and GQ the GUILLOU and QUISQUATER algorithm. The invention is represented by the three examples Ex1, Ex2 and Ex3.

| | Identification | | | Signature | | | |
|---|---|---|---|---|---|---|---|
| Algorithm | FS | GQ | Ex2 | FS | GQ | Ex3 | Ex1 |
| Prestored keys | 20 | 1 | 10 | 64 | 1 | 22 | 35 |
| Security level | $2^{-20}$ | $2^{-20}$ | $2^{-18}$ | $2^{-64}$ | $2^{-64}$ | $2^{-64}$ | $2^{-64}$ |
| Calculation time | 11 | 51 | 11 | 33 | 161 | 31 | 22 |

What is claimed as new and desired to be secured by letters patent of the United States:

1. A computer implemented method by which a claimant is identified by a verifier with a desired security level, comprising:

selecting a number n, k numbers $s_1, s_2, \ldots s_k$ less than n, and an exponent e, wherein n is a product of two prime numbers, k is an integer, and $e \leq 3$;

generating a secret key comprising said k numbers, $s_1, s_2, \ldots s_k$, said secret key being known only to the claimant;

calculating k numbers $v_1, v_2, \ldots v_k$, wherein $v_i = s_i^{-e}$ mod n, and i is an integer index from 1 to k included;

generating a public key comprising said number n, said numbers $v_1, v_2, \ldots v_k$, and said exponent e, said public key being accessible by the verifier;

drawing by the claimant a number r, wherein $0 \leq r \leq n-1$;

calculating by a processor in the claimant a control number x, wherein $x = r^e$ mod n;

transmitting said control number x from the claimant to the verifier;

choosing an integer p based on the desired security level, wherein 1<p<k;

drawing p integers between 1 and k included;

drawing p numbers $a_p$'s such that $1 \leq a_p \leq e-1$;

setting $a_i=0$ for $i \neq p$ and for $1 \leq i \leq k$;

transmitting a question from said verifier to said claimant, said question comprising said $a_1, a_2, \ldots, a_k$;

calculating by said processor in the claimant an answer y, wherein $$y = r \prod_{i=1 \text{ to } k} s_i^{a_i} \bmod n;$$

transmitting said answer from the claimant to the verifier;

calculating by a processor in the verifier a verifying expression given by:

$$y^e \prod_{i=1 \text{ to } k} v_i^{a_i} \bmod n$$

verifying the claimant identity by the verifier, wherein the claimant identity is verified if said verifying expression equals the control number x.

2. A computer implemented method by which a claimant is identified by a verifier with a desired security level, comprising:

selecting a number n, k numbers $s_1, s_2, \ldots s_k$ less than n, and an exponent e, wherein n is a product of two prime numbers, k is an integer, and $e \leq 3$;

generating a secret key comprising said k numbers, $s_1, s_2, \ldots s_k$, said secret key being known only to the claimant;

calculating k numbers $v_1, v_2, \ldots v_k$, wherein $v_i = s_i^{-e} \bmod n$, and i is an integer index from 1 to k included;

generating a public key comprising said number n, said numbers $v_1, v_2, \ldots v_k$, and said exponent e, said public key being accessible by the verifier;

drawing by the claimant a number r, wherein $0 \leq r \leq n-1$;

calculating by a processor in the claimant a control number h, wherein h=H(x) and $x=r^e \bmod n$, H being a one-way function;

transmitting said control number h from the claimant to the verifier;

choosing an integer p based on the desired security level, wherein 1<p<k;

drawing p integers between 1 and k included;

drawing p numbers $a_p$'s such that $1 \leq a_p \leq e-1$;

setting $a_i=0$ for $i \neq p$ and for $1 \leq i \leq k$;

transmitting a question from said verifier to said claimant, said question comprising said $a_1, a_2, \ldots, a_k$;

calculating by said processor in the claimant an answer y, wherein $$y = r \prod_{i=1 \text{ to } k} s_i^{a_i} \bmod n;$$

transmitting said answer from the claimant to the verifier;

calculating by a processor in the verifier a verifying expression given by:

$$H\left(y^e \prod_{i=1 \text{ to } k} v_i^{a_i}\right) \bmod n$$

verifying the claimant identity by the verifier, wherein the claimant identity is verified if said verifying expression equals the control number h.

3. A method as in claim 1 or 2, wherein all steps are repeated sequentially a number t times.

4. A method as in claim 1 or 2, wherein:

calculating the control number x is performed t times thereby calculating t control numbers in parallel;

transmitting the control number is performed t times in parallel;

transmitting the question is performed t times in parallel;

calculating the answer is performed t times in parallel;

transmitting the answer is performed t times in parallel;

calculating the verifying expressions is performed t times in parallel; and verifying the claimant identity is performed by the verifier based on the t verifying expressions.

5. A method as in claim 1 or 2, wherein choosing p is performed so that $p \approx k/2$.

6. A method as in claim 1 or 2, wherein choosing p is performed so that p is within 8.57% of k/2.

7. A method as in claim 1, wherein the product $$P = \prod_{i=1}^{k} s_i^{a_i}$$

is calculated by performing the following:

a) setting S=P=1 and d=e−1;

b) calculating $S = S \cdot \Pi s_i^{a_i}$ with $1 \leq i \leq k$ and $a_i=d$;

c) calculating P=P·S;

d) reducing d by one unit; and e) repeating steps b), c) and d) for d>0.

8. A method as in claim 1, wherein the product $$P = \prod_{i=1}^{k} v_i^{a_i}$$

is calculated by performing the following:

a) setting S=P=1 and d=e−1;

b) calculating $S = S \cdot \Pi v_i^{a_i}$ with $1 \leq i \leq k$ and $a_i=d$;

c) calculating P=P·S;

d) reducing d by one unit; and e) repeating steps b), c) and d) for d>0.

9. A computer implemented method to create a signature for a message m sent by a claimant and received by a verifier who verifies the signature, comprising:

selecting a number n, k numbers $s_1, s_2, \ldots s_k$ less than n, and an exponent e, wherein n is a product of two prime numbers, k is an integer, and $e \leq 3$;

generating a secret key comprising said k numbers $s_1, s_2, \ldots s_k$, said secret key being known only to the claimant;

calculating k numbers $v_1, v_2, \ldots v_k$, wherein $v_i = s_i^{-e} \bmod n$, and i is an integer index from 1 to k included;

generating a public key comprising said number n, said numbers $v_1, v_2, \ldots v_k$, and said exponent e, said public key being accessible by the verifier;

drawing by the claimant a number r, wherein $0<r<n-1$;

calculating by a processor in the claimant a control number $x=r^e \bmod n$;

choosing an integer p based on the desired security level, wherein $1<p<k$;

drawing p integers between 1 and k included;

drawing p numbers $a_p$'s such that $1 \leq a_p \leq e-1$ and $(a_1, a_2, \ldots, a_i, a_k) = H(m,x)$, H being a one-way function;

setting $a_i=0$ for $i \neq p$ and for $1 \leq i \leq k$;

calculating y by said processor in the claimant, wherein $$y = r \prod_{i=1 \text{ to } k} s_i^{a_i} \bmod n;$$

transmitting said y and said $a_k$'s from the claimant to the verifier, said y and said $a_k$'s forming said signature;

calculating by a processor in the verifier a verifying expression given by:

$$H\left(m, y^e \prod_{i=1 \text{ to } k} v_i^{a_i}\right) \bmod n$$

verifying the claimant signature by the verifier, wherein the claimant signature is verified if the verifying expression equals $(a_1, a_2, \ldots a_k)$.

10. A method as in claim 9, wherein all steps are repeated sequentially a number t times.

11. A method as in claim 9, wherein:

calculating the control number x is performed t times thereby calculating t control expressions in parallel;

transmitting the control number is performed t times in parallel;

transmitting the question is performed t times in parallel;

calculating the answer is performed t times in parallel;

transmitting the answer is performed t times in parallel;

calculating the verifying expressions is performed t times in parallel; and verifying the claimant signature is performed by the verifier based on the t verifying expressions.

12. A method as in claim 9, wherein choosing p is performed so that $p \approx k/2$.

13. A method as in claim 9, wherein choosing p is performed so that p is within 8.57% of k/2.

14. A method as in claim 9, wherein the product $$P = \prod_{i=1}^{k} s_i^{a_i}$$

is calculated by performing the following:

a) setting $S=P=1$ and $d=e-1$;

b) calculating $S=S \cdot \Pi s_i^{a_i}$ with $1 \leq i \leq k$ and $a_i=d$;

c) calculating $P=P \cdot S$;

d) reducing d by one unit; and e) repeating steps b), c) and d) for $d>0$.

15. A method as in claim 8, wherein the product $$P = \prod_{i=1}^{k} v_i^{a_i}$$

is calculated by performing the following:

a) setting $S=P=1$ and $d=e-1$;

b) calculating $S=S \cdot \Pi v_i^{a_i}$ with $1 \leq i \leq k$ and $a_i=d$;

c) calculating $P=P \cdot S$;

d) reducing d by one unit; and e) repeating steps b), c) and d) for $d>0$.

* * * * *